United States Patent

[11] 3,581,571

[72] Inventor James W. Angus
 Baldwin, N.Y.
[21] Appl. No. 803,722
[22] Filed Mar. 3, 1969
[45] Patented June 1, 1971
[73] Assignee Kollsman Instrument Corporation
 Syosset, N.Y.

[54] FAIL-SAFE AIRCRAFT INSTRUMENT AND SERVO STABILIZER THEREFOR
 7 Claims, 4 Drawing Figs.
[52] U.S. Cl. ..................................... 73/386,
 73/430
[51] Int. Cl. ..................................... G01d 11/10,
 G071 7/12
[50] Field of Search ........................................... 73/388,
 384, 386, 430

[56] References Cited
UNITED STATES PATENTS
3,009,357 11/1961 Andresen, Jr. ............... 73/384

| 3,083,575 | 4/1963 | Frohardt | 73/384 |
| 3,160,012 | 12/1964 | Andresen, Jr. | 73/384 |
| 3,436,967 | 4/1969 | Post | 73/430 |

FOREIGN PATENTS

| 903,186 | 8/1962 | Great Britain | 73/386 |

Primary Examiner—Louis R. Prince
Assistant Examiner—Joseph W. Roskos
Attorneys—E. Manning Giles, J. Patrick Cagney, Peter S. Lucyshyn and Richard G. Kinney ABSTRACT: A fail-safe servo pneumatic indicating system is provided wherein the pneumatic drive is connected to the indicator of the instrument through a first gear train. The motor of the servodrive is connected, by a second gear train, to an intermediary gear of the first gear train. The synchro of the servodrive is mounted to the shaft of the above-mentioned intermediary gear. A stabilizer is provided which comprises an impact element riding with the indicator shaft and mounted for a predetermined amount of free rotary movement relative to the shaft so that it will provide kinetic energy to the system in opposition to kinetic energy imparted to the system upon incidence of oscillation of the indicator.

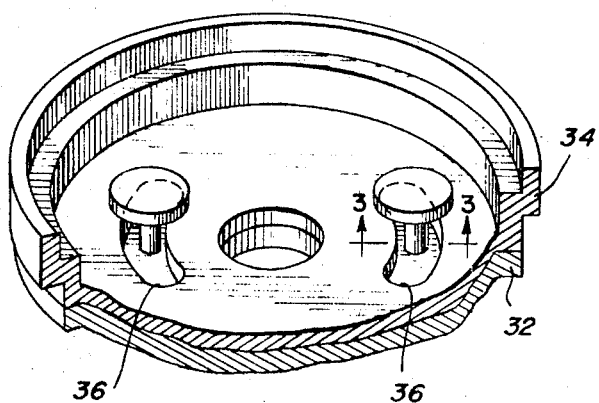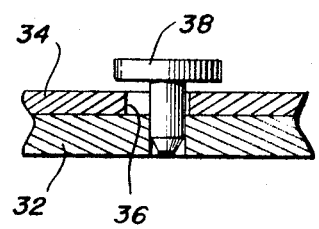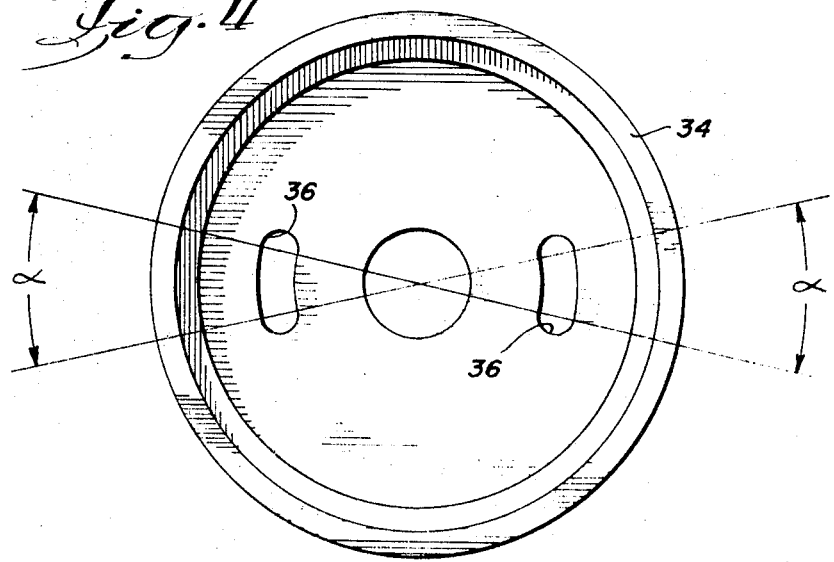

FAIL-SAFE AIRCRAFT INSTRUMENT AND SERVO STABILIZER THEREFOR

BACKGROUND OF THE INVENTION

Fail-safe instruments are known to the art and one such system, for example, is shown in U.S. Pat. No. 3,160,012 entitled Fail Safe Aircraft Instrument. Briefly, there is disclosed an aircraft instrument having an indicator shaft which is driven both by a pressure-responsive pneumatic-drive mechanism and by an electrical servosystem. The servosystem includes a drag-cup motor and a synchro control transformer, each having a rotor mechanically connected to the indicator shaft. In operation, the pneumatic driving means acts to position the indicator according to a given parameter. Simultaneously, an electrical computing system accounts for known errors in the parameters used by the pneumatic-drive system and directs the servosystem to cause the drag-cup motor to drive the output shaft until the position of the output shaft, as sensed by the synchro rotor corresponds to the required value determined by the electrical computing system.

While instruments constructed in accordance with the teachings of the above-identified patent have performed satisfactorily, there is an ever increasing need for devices of this type which are more compact and which utilize drive mechanisms characterized by extremely low friction so that when the pneumatic-drive mechanism operates alone to drive the indicator pointer, errors will not be introduced as a result of friction in the system.

While it is desirable to maintain low friction in the drive mechanisms of the system, low-friction mechanisms are subject, at times, to a condition of undesirable oscillation. That is, under certain circumstances, if a shock is introduced to the system (either mechanical or electrical), the system is subject to sustained oscillation.

Accordingly, a need exists for a compact fail-safe servo pneumatic instrument wherein the level of internal inertia and friction is kept to a minimum and wherein means are provided to attenuate the system to servo stability

SUMMARY OF THE INVENTION

In accordance with the present invention, an improved fail-safe servo pneumatic indicating system is provided comprising an output shaft, low-friction drive mechanism rotatably positioning the shaft, the drive mechanism including the electrically actuated servo drive mechanism and a pressure-responsive pneumatic-drive mechanism interconnected in an operating relationship wherein the servo drive mechanism normally overrides the pneumatic-drive mechanism to apply a servo corrected movement to the output shaft and wherein the pneumatic-drive mechanism acts to apply an approximate movement to the output shaft upon failure of the servo drive mechanism, and stabilizing means comprising an impact element riding with the shaft and mounted for a predetermined amount of free rotary movement relative thereto to provide an opposing impact thereto upon the incidence of oscillation of the low-friction drive mechanism.

In the presently preferred embodiment of the invention, a first low-friction gear train connects the pneumatic-drive mechanism to the output shaft, a second low-friction gear train connects the drag-cup motor to an intermediary gear of the first gear train, the rotor of the synchro transformer being directly mounted to the shaft of the intermediary gear. Thus, there is provided a compact fail-safe servo pneumatic indicating system wherein the driving system is characterized by extremely low friction so as to minimize errors when the system is operating in its penumatic-drive mode.

One of the important features of the present invention relates to an impact element riding with a high-speed shaft and mounted for a predetermined amount of free rotary movement relative thereto to provide an opposing impact thereto upon the incidence of oscillation of said low-friction drive mechanism.

Other features and advantages of the invention will be apparent from the following description and claims and are illustrated in the accompanying drawings which show structure embodying preferred features of the present invention and the principals thereof, and what is now considered to be the best mode in which to apply these principals.

BRIEF DESCRIPTION OF THE DRAWINGS

FIG. 2 is a perspective view of a stabilizing element incorporated in the altimeter shown in FIG. 1;

FIG. 3 is an enlarged fragmentary sectional view taken approximately as indicated on the line 3–3 of FIG. 2 and showing the pin mounting thereof; and FIG. 4 is a top plan view of the rotatable portion of the stabilizer in accordance with the present invention.

DESCRIPTION OF THE PREFERRED EMBODIMENT ON THE PRESENT INVENTION

Figure 1:
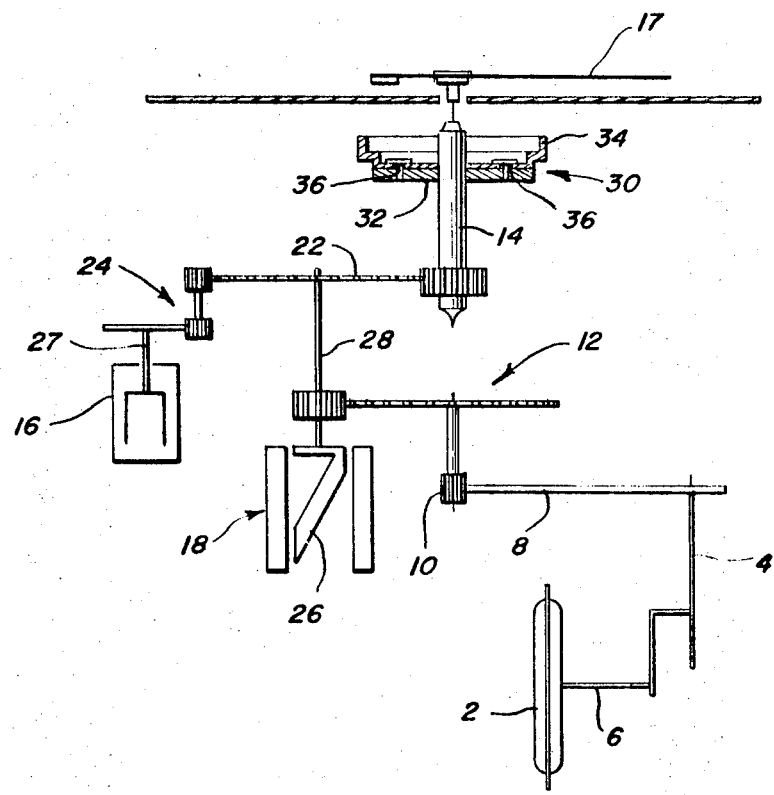
FIG. 1 is a schematic view showing a fail-safe servo pneumatic altimeter constructed in accordance with the present invention.

Referring first to FIG. 1, the instrument incorporates an aneroid system comprising a diaphragm-type pressure capsule 2 which expands and contracts responsive to static pressures applied thereto. The output of diaphragm 2 acts through a suitable linkage 6 to rotate shaft 4, which is fixed to gear sector 8. Preferably gear sector 8 and its pinion 10 are such that a full deflection of the diaphragm 2 will result in approximately full rotation of pinion 10. Rotation of the pinion 10 is transferred to rotary motion of shaft 14 through the gear train 12. Preferably gear train 12 is such that shaft 14 will rotate one rotation for each 1,000 feet of altitude.

It is known that certain characteristic errors are introduced to the pneumatic-drive mechanism and that these errors can be predicted. To correct for these errors it has been the practice to utilize a servo drive system including a drag-cup motor and a synchro controlled transformer, which normally overrides the pneumatic-drive system. In accordance with this practice, synchro control transformer 18 receives signals from a remote onboard computer (not shown) and directs the drag-cup motor 16 to apply torque to position the indicator 17 in defiance of the torque produced by the pneumatic-drive system.

Heretofore, it has been the practice to mount the rotor of the drag-cup motor 16 directly to the output shaft 14. In accordance with one aspect of the present invention, the drag-cup motor 16 is shown to one side of the system so as to enable the length of the altimeter housing (not shown) to be shortened by at least the length of the motor. This arrangement also has the advantage of materially reducing the inertia of the system and, correspondingly, increasing the accuracy of the pneumatic-drive mode of operation. It will be noted that when electrical operation is selected, the repositioning of shaft 14 by the torque of motor 16 results from the biasing force which the motor provides against the aneroid capsules. The rotor of the drag-cup motor 16 may be of aluminum, its mass being of the order ½ gram.

Because the drag-cup motor 16 remains mechanically connected to the intermediary gear 22 of gear train 12 through a gear train 24, even when the electrical operation is not operative, it is important to minimize the frictional effect of gear train 24 during the pneumatic mode of operation. This is accomplished in the illustrated embodiment wherein gear train 24 is such that the ratio of rotation of shaft 27 to shaft 14 is no greater than 2 to 1.

In order to actuate motor 16 from a servosystem, a synchro control transformer 18 has a rotor 26 mounted directly to shaft 28 of the intermediary gear 22 of gear train 12. The rotor of synchro 18 has a weight of the order of ¾ of a gram and has no friction-producing brushes. The portion of gear train 12 connecting the rotor of synchro 18 to shaft 14 is such that the rotor 26 will turn through 360° for a 10,000 foot change in altitude. This permits a correction of errors in the pneumatic system of up to 5,000 feet.

The operation of the fail-safe servo pneumatic system is fully disclosed in the aforesaid patent. Suffice it to say that when the position of pointer 17, as determined by the output of synchro 18, is different from the remote signal of the on-board computer, an error signal will be delivered to an amplifier (not shown) which energizes the drag-cup servomotor 16 so that the torque thereof depends upon the magnitude of the error signal, while the direction of rotation of motor 16 depends upon the sense of the error signal. When the error signal approaches zero, the altimeter indication will approach that determined by the computer. In the event of a power failure or electrical malfunction or when the servo becomes inoperative, the servo is deenergized and the altimeter immediately returns to the diaphragm-sensed indication.

While it is desirable to keep the friction and inertia of the system at its lowest possible level, for the reasons explained above, if a shock is introduced either mechanically or electrically to the low-friction system, the system may go into oscillation. In such cases, shaft 28 turns the rotor 26 of the synchro 18 to a position which is nearly stable (often referred to as a null). Because of the low friction of the system and lack of inertia dampers of the conventional design, and because the biasing forces against which the motor action operates is extremely small in such cases, a shock to the system often results in rapid low-amplitude oscillation of the indicator 17.

To eliminate this tendency of oscillation, a stabilizer 30 is mounted to a high-speed shaft in the system. In the preferred embodiment, as illustrated herein, the stabilizer is shown mounted to the output shaft 14. It should be noted that shaft 27 also operates at sufficiently high speed to accommodate a suitable stabilizer.

Referring to FIGS. 2—4 the stabilizer 30 comprises a disc 32 rigidly secured to shaft 14. A thin shell 34 is loosely mounted atop disc 32 by a pair of pins 38 such that shell 34 has a limited freedom angle of rotation. When the system is subjected to a high frequency, low-amplitude oscillation, shell 34 will act as a shock device. Thus, as the shaft 14 moves in one direction, the pins 38 push the shell 34 along. When the shaft 14 reverses its direction, the shell 34 continues to move until the pins (now moving opposite) have traversed the angle $\alpha$ relative to the loose shell. Due to the opposite rotations at the point of contact between the pins 38 and the loose shell 34, an impact results which is made equal to the kinetic energy of the system at the centroid of the oscillation. The constraints are basically the matching of the kinetic energy level so that if the system gets into oscillation, it will be attenuated within one cycle to a level that results in the decay of the oscillation to an undetectable level.

It should be noted that in the operation above considered, the velocity of the element is the most significant factor and not the mass. To keep the dead load on the system to a minimum the stabilizer 30 is configured to concentrate the mass at its outer peripheral regions. Thus, the shell 34 is of generally cup-shaped form and has an upstanding rim portion constituting a substantial portion of its total mass. The stabilizer 30 is symmetrical to provide for dynamic stability and is provided with a plurality of symmetrically spaced impact points to prevent shear loading at the bearing in which shaft 14 is pivoted.

While preferred construction features of the invention are embodied in the structure illustrated herein, it is to be understood that changes and variations may be made by those skilled in the art without departing from the spirit and scope of the appended claims.

The embodiments of the invention in which an exclusive privilege or property I claim are defined as follows:

1. A fail-safe servo pneumatic indicating system having an output shaft, drive mechanism rotatably positioning said shaft, said drive mechanism including an electrically actuated servo drive mechanism and a pressure-responsive pneumatic drive mechanism interconnected in an operating relationship wherein said servo drive mechanism normally overrides said pneumatic drive mechanism to apply a servo corrected movement to said output shaft and wherein said pneumatic-drive mechanism acts to apply an approximate movement to said output shaft upon failure of said servo drive mechanism, said servo drive mechanism including a drag-cup motor having a rotor and a synchro transformer having a rotor, said system being characterized by a first low-friction gear train connecting said pneumatic drive mechanism to said output shaft, said first gear train having a shaft mounting an intermediary gear and connected to the rotor of said synchro transformer by a separate second low-friction gear train independently connecting the rotor of said drag-cup motor to said intermediary gear.

2. In a fail-safe servo pneumatic indicating system, an output shaft, low-friction drive mechanism rotatably positioning said shaft, said drive mechanism including an electrically actuated servo drive mechanism and a pressure-responsive pneumatic drive mechanism interconnected in an operating relationship wherein said servo drive mechanism normally overrides said pneumatic drive mechanism to apply a servo corrected movement to said output shaft and wherein said pneumatic-drive mechanism acts to apply an approximate movement to said output shaft upon failure of said servo drive mechanism, and stabilizing means comprising an impact element riding with said shaft and mounted for a predetermined amount of free rotary movement relative thereto to provide an opposing impact thereto upon the incidence of oscillation of said low-friction drive mechanism, said impact element being configured to provide a plurality of symmetrically disposed impact points relative to said output shaft.

3. In a fail-safe servo pneumatic indicating system, an output shaft, low-friction drive mechanism rotatably positioning said shaft, said drive mechanism including an electrically actuated servo drive mechanism and a pressure-responsive pneumatic-drive mechanism interconnected in an operating relationship wherein said servo drive mechanism normally overrides said pneumatic drive mechanism to apply a servo corrected movement to said output shaft and wherein said pneumatic-drive mechanism acts to apply an approximate movement to said output shaft upon failure of said servo drive mechanism, and stabilizing means comprising an impact element riding with said shaft and mounted for a predetermined amount of free rotary movement relative thereto to provide an opposing impact thereto upon the incidence of oscillation of said low-friction drive mechanism, said impact element having a configuration, symmetrical with respect to the output shaft, and having a mass concentration adjacent its outer periphery.

4. In a fail-safe servo pneumatic indicating system, an output shaft, low-friction drive mechanism rotatably positioning said shaft, said drive mechanism including an electrically actuated servo drive mechanism and a pressure-responsive pneumatic-drive mechanism interconnected in an operating relationship wherein said servo drive mechanism normally overrides said pneumatic-drive mechanism to apply a servo corrected movement to said output shaft and wherein said pneumatic-drive mechanism acts to apply an approximate movement to said output shaft upon failure of said servo drive mechanism, and stabilizing means comprising an impact element riding with said shaft and mounted for a predetermined amount of free rotary movement relative thereto to provide an opposing impact thereto upon the incidence of oscillation of said low-friction drive mechanism, said impact element being of cup-shaped configuration symmetrical with respect to the output shaft, having a mass concentration adjacent its outer periphery and providing a plurality of symmetrically disposed impact points relative to said output shaft.

5. In an indicating instrument that includes a servo drive mechanism having an axially rotatable shaft connected to determine the position of an output indicator, stabilizer means for dampening oscillation of said servo drive mechanism, said stabilizer means comprising impact means fixed to rotate with said shaft, and an impact element disassociated from said servo drive mechanism and carried by said impact means in relatively rotatable captive relation therewith to impact with said impact means upon a predetermined amount of relative rotation therebetween occurring upon the incidence of oscillation of said servo drive mechanism, said impact element having a mass sufficient to apply impact kinetic energy substantially matched to the kinetic energy of the servo drive mechanism at the centroid of oscillation.

6. In an indicating instrument that includes a servo drive mechanism having an axially rotatable shaft connected to determine the position of an output indicator, stabilizer means for dampening oscillation of said servo drive mechanism, said stabilizer means comprising impact means fixed to rotate with said shaft, and an impact element carried by said impact means in relatively rotatably captive relation therewith for impacting with said impact means upon a predetermined amount of relative rotation therebetween, said impact element having a configuration, symmetrical with respect to said shaft, and a mass concentration adjacent its outer periphery.

7. In an indicating instrument in accordance with claim 6 wherein said impact element comprises a generally cup-shaped structure having a bottom wall portion provided with a plurality of arcuate slots, said impacting means including a plurality of pins extending parallel to said shaft through said slots.